United States Patent
Bergman et al.

(10) Patent No.: US 9,242,886 B2
(45) Date of Patent: Jan. 26, 2016

(54) DELIVERY APPARATUS FOR A GLASS MANUFACTURING APPARATUS AND METHODS

(75) Inventors: Richard Bergman, Horseheads, NY (US); Raymond E. Fraley, Waverly, NY (US)

(73) Assignee: CORNING INCORPORATED, Corning, NY (US)

( * ) Notice: Subject to any disclaimer, the term of this patent is extended or adjusted under 35 U.S.C. 154(b) by 20 days.

(21) Appl. No.: 12/952,477

(22) Filed: Nov. 23, 2010

(65) Prior Publication Data

US 2012/0125051 A1    May 24, 2012

(51) Int. Cl.
| | |
|---|---|
| C03B 5/26 | (2006.01) |
| C03B 7/07 | (2006.01) |
| C03B 5/187 | (2006.01) |
| C03B 7/02 | (2006.01) |
| C03B 17/06 | (2006.01) |

(52) U.S. Cl.
CPC . *C03B 7/07* (2013.01); *C03B 5/187* (2013.01); *C03B 7/02* (2013.01); *C03B 17/064* (2013.01)

(58) Field of Classification Search
CPC ............ C03B 7/02; C03B 7/07; C03B 5/187; C03B 17/064
USPC ................... 65/126, 128, 325, 324, 326, 327; 219/61.6, 607, 59.1, 535; 138/177
See application file for complete search history.

(56) References Cited

U.S. PATENT DOCUMENTS

| | | | |
|---|---|---|---|
| 1,820,247 A * | 8/1931 | Ræder .............................. | 373/33 |
| 2,370,288 A * | 2/1945 | Brolinson ................ | 204/196.37 |
| 2,569,459 A | 10/1951 | DeVoe .............................. | 49/77 |
| 2,739,665 A * | 3/1956 | Evans .............................. | 96/362 |
| 2,749,379 A * | 6/1956 | Geffcken et al. ............... | 373/39 |
| 2006/0042318 A1* | 3/2006 | Burdette et al. ............. | 65/134.2 |

(Continued)

FOREIGN PATENT DOCUMENTS

| | | |
|---|---|---|
| CN | 101144925 A | 3/2008 |
| DE | 19948634 A1 | 4/2001 |

(Continued)

OTHER PUBLICATIONS

JP 06227822 (Machine Translation) [online], [retrieved on Aug. 21, 2012], retrieved from PAJ Database (http://www19.ipdl.inpit.go.jp/PA1/cgi-bin/PA1INDEX).*
European Search report for European Application No. EP 11 19 0001, (2 pages), Mar. 5, 2012.

*Primary Examiner* — Richard Crispino
*Assistant Examiner* — Yana B Krinker
(74) *Attorney, Agent, or Firm* — Kevin M. Able (57) ABSTRACT

Delivery apparatus include an electrical circuit configured to heat a linear conduit and an elbow conduit. A first electrode can be mounted to an upstream portion of the linear conduit, a second electrode can be mounted downstream of the upstream portion, and a third electrode can be mounted to a curved segment of the elbow conduit within a footprint extension of a first passage of the linear conduit. In further examples, a delivery apparatus includes an electrical circuit with a first electrode mounted to an upstream portion of a linear conduit, a second electrode mounted to a downstream portion of the linear conduit, and a third electrode mounted to an elbow conduit. In still further examples, methods of heating molten glass include application of an electrical current such that neither a current flux through a linear conduit nor a current flux through an elbow conduit exceeds 8 amps/mm$^2$.

21 Claims, 5 Drawing Sheets

(56) References Cited

U.S. PATENT DOCUMENTS

2008/0083250 A1\* 4/2008 Nagno et al. .................. 65/355
2008/0092597 A1\* 4/2008 Itoh et al. .................... 65/355
2010/0269545 A1\* 10/2010 Boratav et al. ................ 65/128

FOREIGN PATENT DOCUMENTS

| EP | 1050513 A2 | 11/2000 | |
| JP | 06227822 A * | 8/1994 | ................ C03B 5/26 |
| WO | 2005110934 A2 | 11/2005 | |

\* cited by examiner

(54) DELIVERY APPARATUS FOR A GLASS MANUFACTURING APPARATUS AND METHODS

FIELD

The present disclosure relates generally to delivery apparatus and methods, and more particularly, to delivery apparatus for a glass manufacturing apparatus and methods.

BACKGROUND

It is known to apply heat to glass that is moving through a metal delivery tube by applying a current to the metal delivery tube. During this process, the current density at a certain part of the delivery tube may become disproportionately high and, consequently, the quality of glass may be non-homogeneous or the longevity of the delivery tube may suffer. Thus, there is a need for methods and apparatus for accomplishing a distribution of current density that is more even throughout the delivery tube.

SUMMARY

The following presents a simplified summary of the disclosure in order to provide a basic understanding of some example aspects described in the detailed description.

In one example aspect, a delivery apparatus for a glass manufacturing apparatus includes a linear conduit, an elbow conduit, and an electrical circuit. The linear conduit extends along an axis, and includes an upstream portion and a downstream portion with a first passage defined between the upstream and downstream portions. The first passage is configured to provide a path for a quantity of molten glass traveling through the linear conduit. A stirring element configured to stir the molten glass traveling through the linear conduit may be positioned within the first passage. The elbow conduit includes an upstream portion and a downstream portion with a second passage defined between the upstream and downstream portions of the elbow conduit. The upstream portion of the elbow conduit is joined to the downstream portion of the linear conduit such that the first passage is in fluid communication with the second passage. The elbow conduit is bent out of a direction of the axis of the linear conduit so as to extend away from a footprint extension of the first passage of the linear conduit thereby defining a curved segment located within the footprint extension. The electrical circuit is configured to heat the linear conduit and the elbow conduit. The electrical circuit includes a first electrode mounted to the upstream portion of the linear conduit, a second electrode mounted downstream of the upstream portion of the linear conduit, and a third electrode mounted to the curved segment within the footprint extension.

In another example aspect, a method of heating molten glass includes the steps of channeling molten glass through a delivery apparatus including a linear conduit defining a first passage and an elbow conduit defining a second passage in fluid communication with the first passage, and heating the molten glass inside the delivery apparatus by applying an electrical current to the linear conduit and the elbow conduit. Neither a current flux through the linear conduit nor a current flux through the elbow conduit exceeds 8 amps/mm².

In yet another example aspect, a delivery apparatus for a glass manufacturing apparatus includes a linear conduit, an elbow conduit and an electrical circuit. The linear conduit extends along an axis and includes an upstream portion and a downstream portion with a first passage defined between the upstream and downstream portions. The first passage is configured to provide a path for a quantity of molten glass traveling through the linear conduit. A stirring element configured to stir the molten glass traveling through the linear conduit may be positioned within the first passage. The elbow conduit includes an upstream portion and a downstream portion with a second passage defined between the upstream and downstream portions of the elbow conduit. The upstream portion of the elbow conduit is joined to the downstream portion of the linear conduit such that the first passage is in fluid communication with the second passage. The electrical circuit is configured to heat the linear conduit and the elbow conduit. The electrical circuit includes a first electrode mounted to the upstream portion of the linear conduit, a second electrode mounted to the downstream portion of the linear conduit, and a third electrode mounted to the elbow conduit.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Apparatus and methods will now be described more fully hereinafter with reference to the accompanying drawings in which example embodiments of the disclosure are shown. Whenever possible, the same reference numerals are used throughout the drawings to refer to the same or like parts. However, this disclosure may be embodied in many different forms and should not be construed as limited to the embodiments set forth herein.

Figure 1:
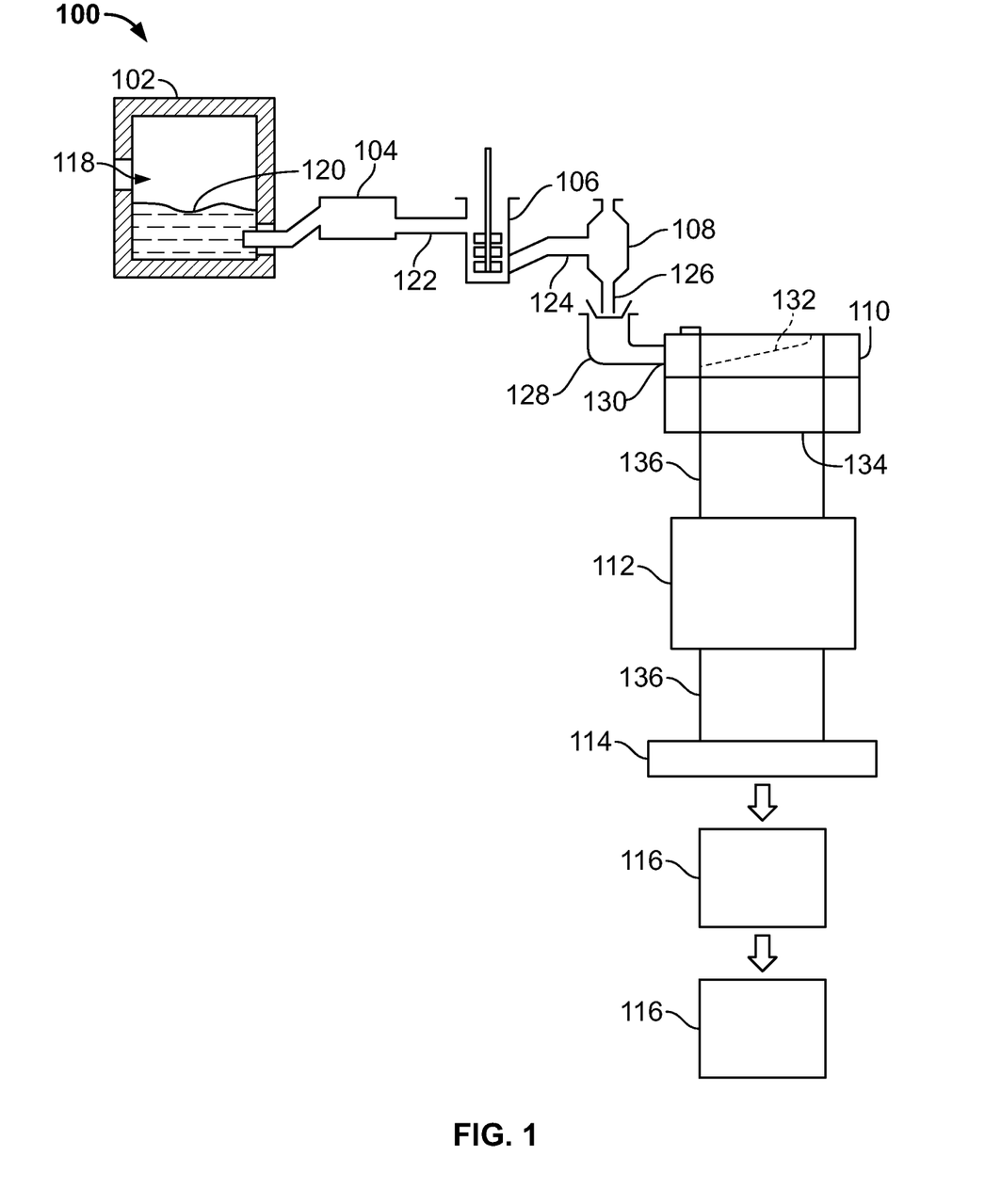
FIG. 1 is a schematic view of a glass manufacturing apparatus.

High quality thin glass sheets can be produced through a fusion process such as an overflow downdraw process. FIG. 1 shows an example embodiment of a glass manufacturing apparatus 100, or a fusion draw machine, more specifically, that implements the fusion process for manufacturing a glass sheet 116. The glass manufacturing apparatus 100 may include a melting vessel 102, a fining vessel 104, a mixing vessel 106 (e.g., the illustrated stir chamber), a delivery vessel 108, a forming vessel 110, a pull roll assembly 112 and a glass scoring assembly 114.

The melting vessel 102 is where the glass batch materials are introduced as shown by arrow 118 and melted to form molten glass 120. The fining vessel 104 has a high temperature processing area that receives the molten glass 120 from the melting vessel 102 and in which bubbles are removed from the molten glass 120. The fining vessel 104 is connected to the mixing vessel 106 by a finer to stir chamber connecting tube 122. Thereafter, the mixing vessel 106 is connected to the delivery vessel 108 by a stir chamber to delivery vessel connecting tube 124. The delivery vessel 108 delivers the molten glass 120 by a downcomer 126 to an inlet 128 and into the forming vessel 110. The forming vessel 110 includes an opening 130 that receives the molten glass 120 which flows into a trough 132 and then overflows and runs down two sides of the forming vessel 110 before fusing together at what is known as a root 134. The root 134 is where the two sides come together and where the two overflow walls of molten glass 120 rejoin before being drawn downward by the pull roll assembly 112 to form the glass ribbon 136. Then, the scoring assembly 114 scores the drawn glass ribbon 136 which is then separated into individual glass sheets 116.

Figure 2:
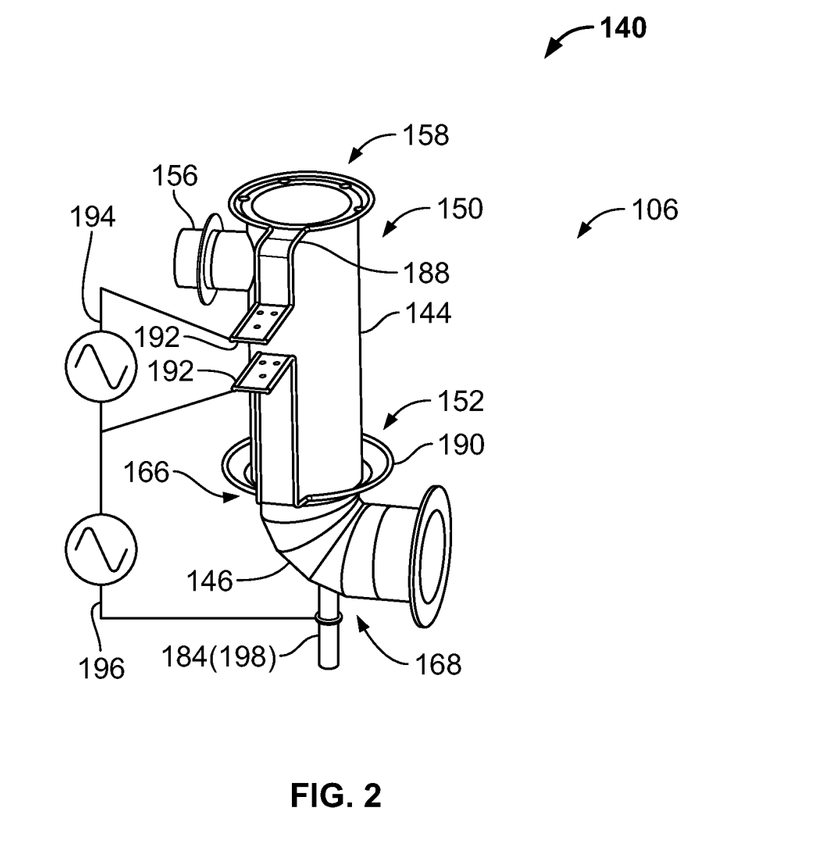
FIG. 2 is perspective view of a first example embodiment of a delivery apparatus with a partially shown electrical circuitry.

FIG. 2 shows a first example embodiment of a delivery apparatus 140 that is part of the glass manufacturing apparatus 100 and through which molten glass 120 is delivered. While various parts of the glass manufacturing apparatus 100 may be embodied as the delivery apparatus 140, this example delivery apparatus 140 is embodied as a mixing vessel 106.

The delivery apparatus 140 may include a stirring element 142 (see FIG. 3), a linear conduit 144 and an elbow conduit 146. The linear conduit 144 includes an upstream portion 150 and a downstream portion 152 defining a first passage 154 therebetween providing a path for the molten glass 120 to move through the linear conduit 144. The upstream portion 150 of the linear conduit 144 may include an entry port 156 by which molten glass 120 from an upstream part of the glass manufacturing apparatus 100 (e.g., the fining vessel 104) enters the first passage 154. The upstream portion 150 may include an opening 158 through which the stirring element 142 extends into the first passage 154 although the stirring element 142 may be configured in a different manner about the linear conduit 144. For example, the stirring element 142 may be entirely enclosed by the linear conduit 144 and the opening 158 may not be provided. The stirring element 142, if present, may be positioned within the first passage 154 and configured to stir the molten glass 120 moving through the linear conduit 144. The stirring element 142 may include a rotating shaft 160 configured with arms or paddles 164 of various shapes projecting away from the shaft 160.

The elbow conduit 146 also includes an upstream portion 166 and a downstream portion 168 defining a second passage 170 therebetween. The upstream portion 166 of the elbow conduit 146 is joined to the downstream portion 152 of the linear conduit 144 such that the first passage 154 is in fluid communication with the second passage 170 allowing the molten glass 120 to move from the linear conduit 144 to the elbow conduit 146. The second passage 170 provides a path for the molten glass 120 to move through the elbow conduit 146.

The linear conduit 144 may be substantially cylindrical such that the first passage 154 that extends along an axis providing a linear path for molten glass 120 to flow through. Contrastingly, the elbow conduit 146 is curved and is bent out of the direction of the axis of the linear conduit 144 such that the elbow conduit 146 extends away from a footprint extension 172 (FIG. 3) of the first passage 154. Thus, the downstream portion 168 of the elbow conduit 146 may be located outside the footprint extension 172 of the first passage 154 of the linear conduit 144. The portion of the elbow conduit 146 that is located within the footprint extension 172 defines a curved segment 174 which includes an inner radius region 176 and an outer radius region 178.

The downstream portion 168 of the elbow conduit 146 may be joined to another part of the glass manufacturing apparatus 100 with which the elbow conduit 146 is in flow communication, such as the stir chamber to delivery vessel connecting tube 124 which leads to the delivery vessel 108. An entry port 180 into the delivery vessel 108 may be located at a higher elevation than the downstream portion 168 of the elbow conduit 146 so that the molten glass 120 will return via a delivery tube 182 toward the elbow conduit 146 once a driving means (not shown) generating movement of the molten glass 120 in the downstream direction is turned off.

A tube-like tap conduit 184 may define a third passage 186 and may be joined to the elbow conduit 146 so as to be in fluid communication with the second passage 170 of the elbow conduit 146. When the driving means is off, the tap conduit 184 may include an opening and closing means (not shown) that is used to drain molten glass 120 out of the delivery apparatus 140 and neighboring part of the glass manufacturing apparatus 100. The opening and closing means may control flow of the molten glass 120 by creating a clog through solidifying the molten glass and undoing the clog by returning the glass to molten state. Alternatively, the opening and closing means may be a component well known in the art such as a valve or the like.

The delivery apparatus 140 includes a number of electrodes for applying a current to the linear conduit 144 and the elbow conduit 146 as the molten glass 120 flows therethrough. In the first embodiment, the linear conduit 144 and the elbow conduit 146 act as resistors arranged in a parallel manner. The linear conduit 144 and elbow conduit 146 are thus resistively heated and heat is transferred to the molten glass 120 during stirring and movement through the conduits 144, 146. The linear conduit 144 and the elbow conduit 146 are made of material with electrically conductive qualities and may be made of platinum alloys, for example.

Figure 3:
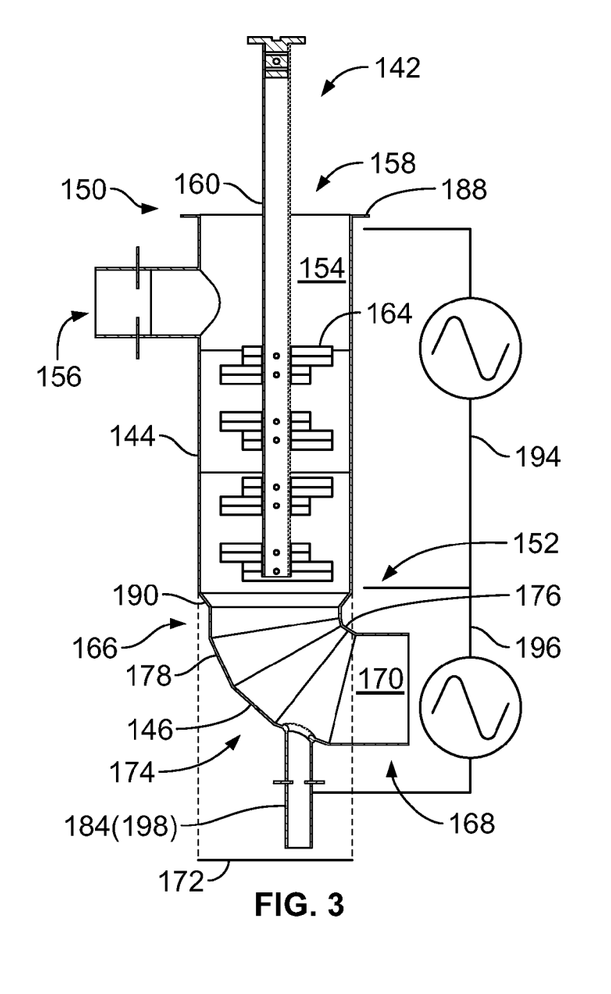
FIG. 3 is a cross-sectional side view of the delivery apparatus.
Figure 4:
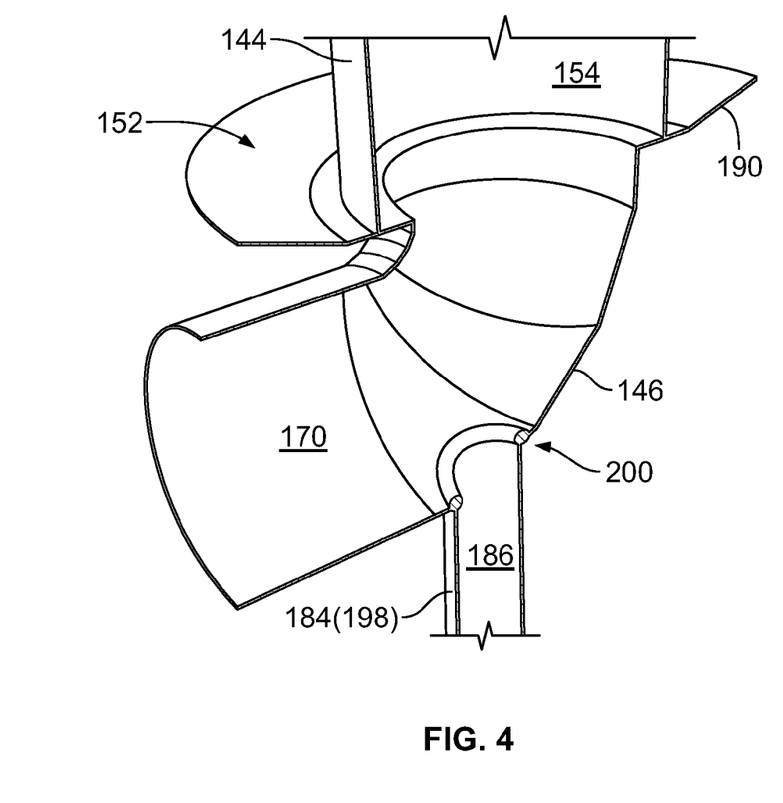
FIG. 4 is a close-up, cross-sectional perspective view of the delivery apparatus.

In the first embodiment of FIGS. 2-3, the linear conduit 144 may include a first electrode 188 mounted to the upstream portion 150 and a second electrode 190 mounted to the downstream portion 152. For example, the second electrode 190 may be located at a junction of the downstream end of the linear conduit 144 and the upstream end of the elbow conduit 146. The first and second electrodes 188, 190 extend around the periphery of the linear conduit 144 such that current can be transmitted in a substantially even manner throughout the linear conduit 144. The first and second electrodes 188, 190 may be embodied as flanges (FIG. 4) or in cylindrical or frusto-conical tube shapes (FIG. 3). The first and second electrodes 188, 190 may directly connect with electrical wires or may include tabs 192 (FIG. 2) that extend out from the flange and connect with electrical wires. Current flows through the linear conduit 144 which is part of a first electrical loop 194.

Still referring to the first embodiment of FIGS. 2-3, current also flows through the elbow conduit 146 which is part of a second electrical loop 196. The second electrode 190 may be configured to be in electrically conductive relationship with the elbow conduit 146 as well as the linear conduit 144 although the upstream portion 166 of the elbow conduit 146 may be provided with a separate electrode if the first electrical loop 194 and the second electrical loop 196 were not electrically connected. The delivery apparatus 140 may further include a third electrode 198 that is joined to a location downstream of the upstream portion 166 of the elbow conduit 146. In the present embodiment, the third electrode 198 is mounted to the outer radius region 178 of the curved segment 174 within the footprint extension 172 of the first passage 154. But the third electrode 198 may also be joined to the elbow conduit 146 at a part of the elbow conduit 146 that is within the footprint extension 172 but away from the outer radius region 178 or a part of the elbow conduit 146 that is not within the footprint extension 172. The variety of the location at which the third electrode 198 can be joined to the elbow conduit 146 also applies to the location at which the tap conduit 184 is joined to the elbow conduit 146. Moreover, as in the present embodiment, the third electrode 198 and the tap conduit 184 may be embodied as a single component such that the tap conduit 184 is used to drain molten glass and to apply current to the elbow conduit 146 as well.

A conduit of the delivery apparatus 140 having a given wall thickness can accommodate current density only up to a certain level. Accordingly, the current density throughout the delivery apparatus 140 is designed to be limited below a predetermined level. For example, the current density is limited to not exceed 8 amps per millimeters squared throughout the present embodiment of the delivery apparatus 140. Because there is a concentration of current flux at the tap conduit 184 from which current flux originates, the thickness of the wall of the tap conduit 184 (as well as the cross sectional area of the tap conduit 184) acts as a limiting factor for the current flux applied to the tap conduit 184 and transmitted to the elbow conduit 146. Thus, in order to increase the current flux transmitted to the elbow conduit 146, the thickness of the wall of the tap conduit 184 may need to be increased and the tap conduit 184 may be thicker than the elbow conduit 146 in wall thickness. For example, the wall thickness of the linear conduit 144 and the elbow conduit 146 may be 0.04 inches while the wall thickness of the tap conduit 184 may be 0.05 inches. Moreover, the current density on the parts of the elbow conduit 146 near a junction or interface 200 of the elbow conduit 146 and the tap conduit 184 may be excessive and may not be borne by the elbow conduit 146 having a given wall thickness. In this case, the interface 200 may be rendered with a ring-shape configuration so as to be thicker than the neighboring parts of the elbow conduit 146 thereby allowing the current flux to dissipate at the interface 200 in order to reduce overheating of the elbow conduit 146 near this region. For example, the thickness of the ring configuration may match or exceed the wall thickness of the tap conduit 184 and may be 0.25 to 1 inches.

During operation of the delivery apparatus 140, molten glass is introduced into the upstream portion 150 and the first passage 154 of the linear conduit 144 through the entry port 156 by the driving means. As the molten glass 120 moves through the first passage 154, the molten glass 120 may be mixed by the stirring element 142. Moreover, the resistive heating of the linear conduit 144 caused by the current applied to the first and second electrodes 188, 190 heats the molten glass. The molten glass continues to move through the second passage 170 in a heated state because the elbow conduit 146 also undergoes resistive heating due to the current applied to the second and third electrodes 190, 198. The molten glass 120 thereafter moves further downstream through the delivery tube 182 to the next station in the glass manufacturing apparatus 100 (e.g., the delivery vessel 108).

Figure 5:
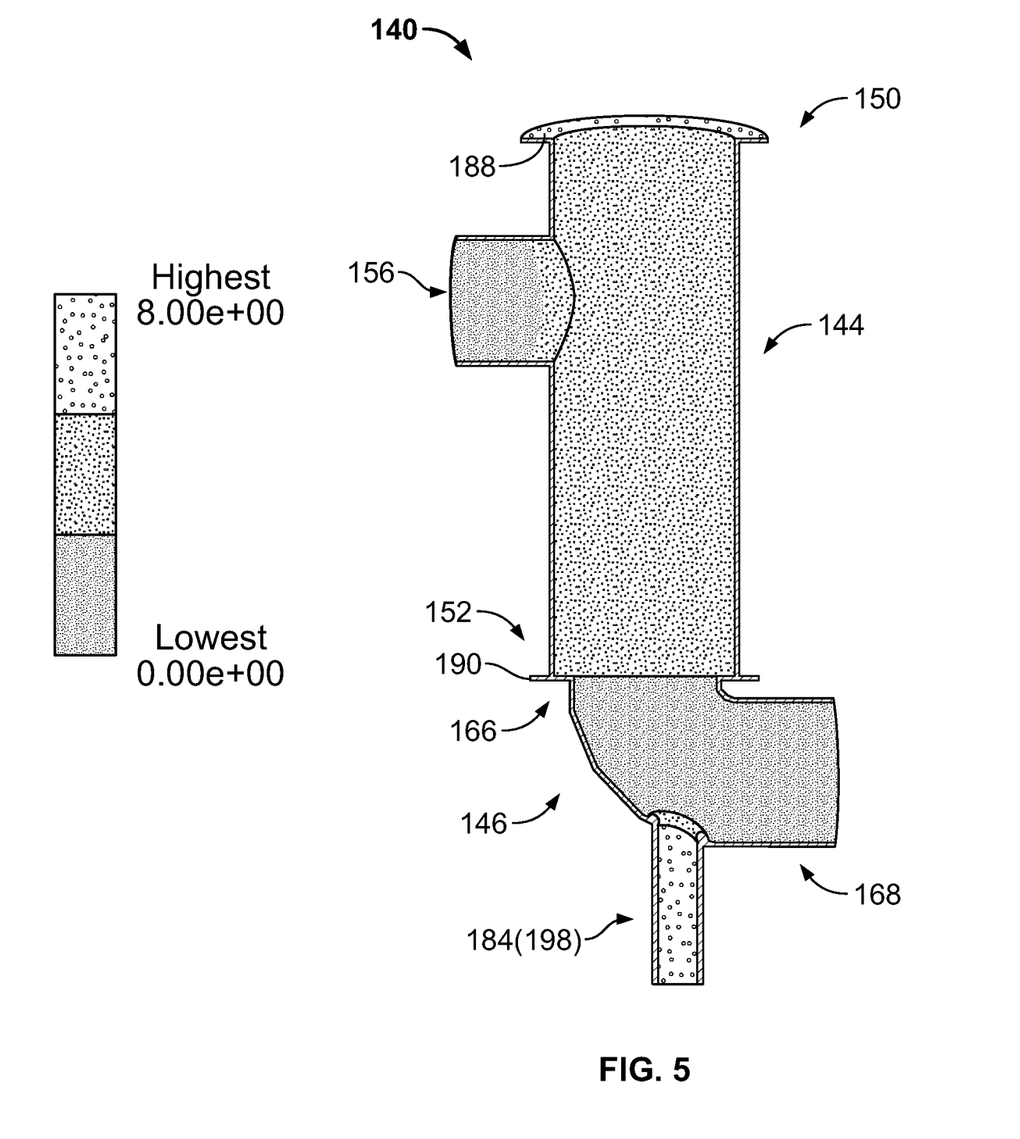
FIG. 5 shows estimated distribution of current density throughout the delivery apparatus.

FIG. 5 shows an estimation of the distribution of current density about the delivery apparatus 140 obtained by inputting current values for the first and second electrical loops 194, 196. As indicated by the legend in FIG. 5, each shade corresponds to a given range of current density values in amps/mm$^2$. In the present embodiment, the electrodes 188, 190 and 198 are in the highest current density range. The linear conduit 144 is in the intermediate current density range while the elbow conduit 146 is in the lowest current density range.

Current flux generally tends to take the shortest path between electrodes. Thus, if current is applied through a curved conduit structure by providing electrodes at the longitudinal ends thereof, there is a peak in current density at an inner radius part of the curved conduit structure. Thus, in an alternative embodiment of the delivery apparatus 140 (not shown) where the second electrode 190 is located at the downstream portion 168 of the elbow conduit 146 and the first electrode 188 is located at the upstream portion 150 of the linear conduit 144, the inner radius region 176 would experience some localized overheating. However, in the present embodiment, the modeling estimates of FIG. 5 show that localized overheating of the conduits 144, 146 can be prevented by keeping the location of the interface 200 at which the tap conduit 184 joins the elbow conduit 146 within the footprint extension 172 of the first passage 154 and/or mounting the second electrode 190 between the linear conduit 144 and the elbow conduit 146. Specifically, in the embodiment of FIGS. 2-3, the current density did not exceed a desired limit (e.g., 8 amps/mm$^2$) and none of the conduits 144 and 146 was shown to have areas of localized overheating where the current density at one spot was disproportionately or non-homogeneously higher than surrounding areas.

Moreover, because the linear conduit 144 is part of the first electrical loop 194 and the elbow conduit 146 is part of the second electrical loop 196 in the illustrated embodiment, a higher level of independence in controlling the current flux through the elbow conduit 146 distinctly from the linear conduit 144 is obtained. Specifically, in an alternative embodiment where the first electrode 188 is joined to the upstream portion 150 of the linear conduit 144, the second electrode 190 is joined to the downstream portion of the elbow conduit 146 and the third electrode 198 is joined to the elbow conduit 146, it is more difficult to control the current flux through the elbow conduit 146 separately from the current flux through the linear conduit 144 so that the range of current density at the elbow conduit 146 cannot differ greatly from the range of current density at the linear conduit 144. In comparison, the modeling estimates of FIG. 5 show the current density at the linear conduit 144 and at the elbow conduit 146 to be so different as to be in non-overlapping ranges in the illustrated embodiment. For example, the range of current density distribution at the elbow conduit 146 may be lower than the range of current density distribution at the linear conduit 144 by an order of magnitude.

Figure 6:
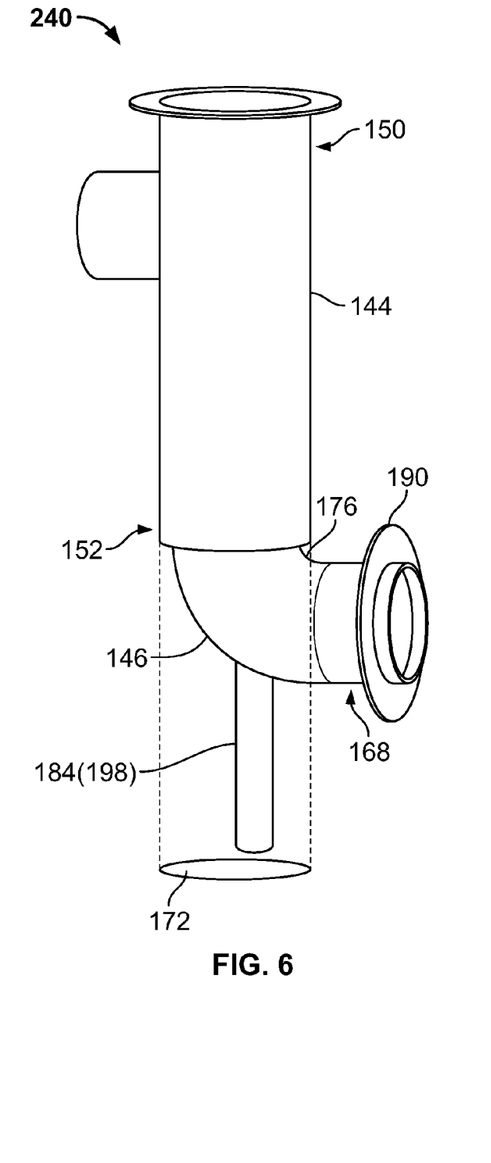
FIG. 6 is a second example embodiment of the delivery apparatus.

FIG. 6 shows a second example embodiment of the delivery apparatus 240 in which the tap conduit 184, embodied as the third electrode 198, is within the footprint extension 172 of the first passage. The location of the tap conduit 184 reduces the tendency of the current flux to concentrate at the inner radius region 176 of the elbow conduit 146. However, unlike the first embodiment of FIG. 5, while the second electrode 190 is downstream of the upstream portion 150 of the linear conduit 144, the second electrode 190 is located at the downstream portion 168 of the elbow conduit 146 instead of being located at the downstream portion 152 of the linear conduit 144. Thus, the current flux in the elbow conduit 146 cannot be controlled independently and separately of the current flux in the linear conduit 144.

Figure 7:
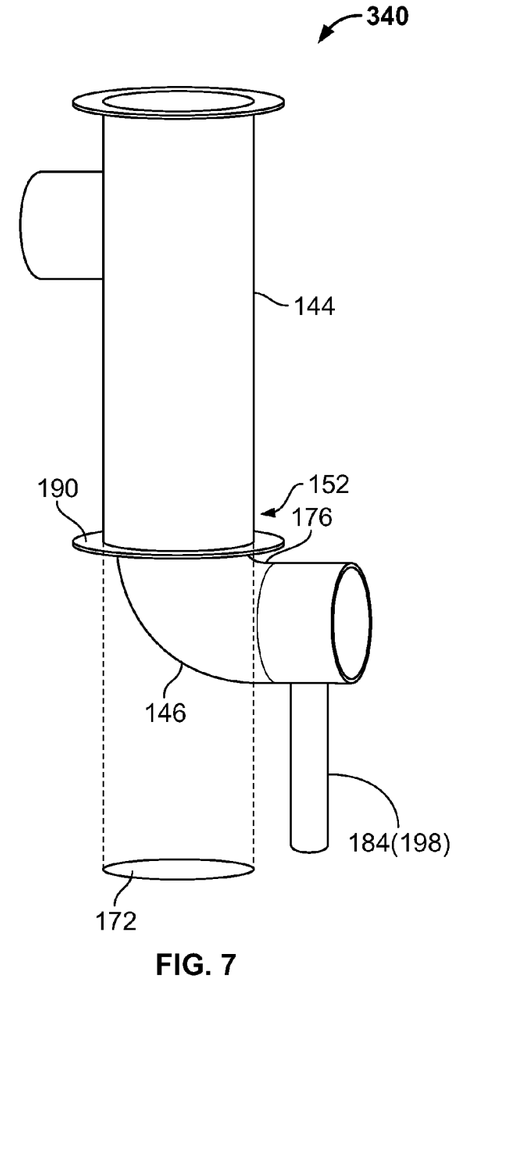
FIG. 7 is a third example embodiment of the delivery apparatus.

FIG. 7 shows a third example embodiment of the delivery apparatus 340 in which the second electrode is located at the downstream portion 152 of the linear conduit 144. As a result, the current flux in the elbow conduit 146 can be controlled independently and separately of the current flux in the linear conduit 144. However, because the tap conduit 184, embodied as the third electrode 198, is located outside of the footprint extension 172 of the first passage 154, localized overheating at the inner radius region 176 of the elbow conduit 146 may occur.

It will be apparent to those skilled in the art that various modifications and variations can be made to the present disclosure without departing from the spirit and scope of the invention. For example, while the preceding description has generally been directed to direct heating of a delivery apparatus that may be in the form of a mixing vessel, the present invention is applicable to other delivery apparatus that include a linear conduit and an elbow conduit, and wherein both the linear conduit and the elbow conduit are to be heated by flowing a current through each. Thus, it is intended that the present invention cover the modifications and variations of this disclosure provided they come within the scope of the appended claims and their equivalents.

What is claimed is:

1. A delivery apparatus for a glass manufacturing apparatus, including:
    a linear conduit extending along an axis, the linear conduit including an upstream portion and a downstream portion with a first passage defined between the upstream and downstream portions, the first passage configured to provide a path for a quantity of molten glass traveling through the linear conduit, the first passage further including a stirring element positioned therein and configured to stir the molten glass traveling through the linear conduit;
    an elbow conduit including an upstream portion and a downstream portion with a second passage defined between the upstream and downstream portions of the elbow conduit, the upstream portion of the elbow conduit joined to the downstream portion of the linear conduit such that the first passage is in fluid communication with the second passage, wherein the elbow conduit is bent out of a direction of the axis of the linear conduit so as to extend away from a footprint extension of the first passage of the linear conduit thereby defining a curved segment located within the footprint extension; and
    an electrical circuit configured to heat the linear conduit and the elbow conduit, the electrical circuit including a first electrode mounted to the upstream portion of the linear conduit, a second electrode mounted downstream of the upstream portion of the linear conduit, and a third electrode mounted to the curved segment so as to be confined within the footprint extension,
    wherein the electrical circuit is configured to apply a current between the second electrode and the third electrode through the elbow conduit.

2. The delivery apparatus of claim 1, wherein the curved segment includes an inner radius region and an outer radius region, and the third electrode is mounted to the elbow conduit at the outer radius region within the footprint extension.

3. The delivery apparatus of claim 1, further comprising a tap conduit joined to the elbow conduit, wherein the tap conduit includes a third passage in fluid communication with the second passage.

4. The delivery apparatus of claim 3, wherein the tap conduit comprises the third electrode.

5. The delivery apparatus of claim 4, wherein the curved segment includes an inner radius region and an outer radius region, and the tap conduit is joined to the elbow conduit at the outer radius region within the footprint extension.

6. The delivery apparatus of claim 3, wherein a wall thickness of the tap conduit and a wall thickness of the elbow conduit are different.

7. The delivery apparatus of claim 3, wherein the elbow conduit includes an interface where the tap conduit is joined to the elbow conduit, and the interface has a larger wall thickness than a neighboring wall thickness of the elbow conduit.

8. The delivery apparatus of claim 7, wherein the interface includes a ring-shaped configuration.

9. The delivery apparatus of claim 1, wherein at least one of the first electrode and the second electrode includes a flange.

10. The delivery apparatus of claim 1, wherein the upstream portion of the linear conduit includes an entry port for the molten glass.

11. The delivery apparatus of claim 1, wherein the second electrode is mounted to the downstream portion of the linear conduit, and the electrical circuit is configured to independently control a current flux through the linear conduit and another current flux through the elbow conduit.

12. The delivery apparatus of claim 1, wherein the electrical circuit is configured such that neither a current flux through the linear conduit nor a current flux through the elbow conduit exceeds 8 amps/mm$^2$.

13. A delivery apparatus for a glass manufacturing apparatus, including:
    a linear conduit extending along an axis, the linear conduit including an upstream portion and a downstream portion with a first passage defined between the upstream and downstream portions, the first passage configured to provide a path for a quantity of molten glass traveling through the linear conduit, the first passage further including a stirring element positioned therein and configured to stir the molten glass traveling through the linear conduit;
    an elbow conduit including an upstream portion and a downstream portion with a second passage defined between the upstream and downstream portions of the elbow conduit, the upstream portion of the elbow conduit joined to the downstream portion of the linear conduit such that the first passage is in fluid communication with the second passage;
    a tap conduit joined to the elbow conduit, wherein the tap conduit includes a third passage in fluid communication with the second passage; and
    an electrical circuit configured to heat the linear conduit and the elbow conduit, the electrical circuit including a first electrode mounted to the upstream portion of the linear conduit, a second electrode mounted to the downstream portion of the linear conduit, and a third electrode mounted to the elbow conduit, wherein the tap conduit comprises the third electrode,
    wherein the electrical circuit is configured to apply a current between the second electrode and the third electrode through the elbow conduit.

14. The delivery apparatus of claim 13, wherein the electrical circuit is configured to heat the linear conduit independently of the elbow conduit.

15. The delivery apparatus of claim 13, wherein the elbow conduit is bent out of a direction of the axis of the linear conduit so as to extend away from a footprint extension of the first passage of the linear conduit thereby defining a curved segment located within the footprint extension, and the tap conduit is mounted to the curved segment within the footprint extension.

16. The delivery apparatus of claim 15, wherein the curved segment includes an inner radius region and an outer radius region, and the tap conduit is mounted to the elbow conduit at the outer radius region within the footprint extension.

17. The delivery apparatus of claim 13, wherein a wall thickness of the tap conduit and a wall thickness of the elbow conduit are different.

18. The delivery apparatus of claim 17, wherein the elbow conduit includes an interface where the tap conduit is joined to the elbow conduit, and the interface has a larger wall thickness than a neighboring wall thickness of the elbow conduit.

19. The delivery apparatus of claim 18, wherein the interface includes a ring-shaped configuration.

20. The delivery apparatus of claim 13, wherein the elbow conduit is bent out of a direction of the axis of the linear conduit so as to extend away from a footprint extension of the first passage of the linear conduit thereby defining a curved segment located within the footprint extension, and the tap conduit is mounted to the elbow conduit outside of the footprint extension.

21. The delivery apparatus of claim 13, wherein the electrical circuit is configured such that neither a current flux through the linear conduit nor a current flux through the elbow conduit exceeds 8 amps/mm$^2$.

* * * * *